United States Patent [19]
Fischer et al.

[11] Patent Number: 5,755,209
[45] Date of Patent: May 26, 1998

[54] SYSTEM FOR CONTROLLING A FUEL-METERING DEVICE

[75] Inventors: Werner Fischer, Heimsheim; Dietbert Schönfelder, Gerlingen; Uwe Reuter, Ditzingen; Peter Lutz, Weinsberg; Peter Schmitz, Ludwigsburg-Ossweil, all of Germany

[73] Assignee: Robert Bosch GmbH, Stuttgart, Germany

[21] Appl. No.: 843,436

[22] Filed: Apr. 15, 1997

Related U.S. Application Data

[63] Continuation of Ser. No. 302,677, filed as PCT/DE93/01121, Nov. 25, 1993, abandoned.

[30] Foreign Application Priority Data

Dec. 15, 1992 [DE] Germany ............ 42 42 252.3

[51] Int. Cl.[6] .................................................. F02M 37/04
[52] U.S. Cl. .................................... 123/501; 123/496
[58] Field of Search ............................. 123/496, 500, 123/501, 357

[56] References Cited

U.S. PATENT DOCUMENTS

| | | | |
|---|---|---|---|
| 4,643,155 | 2/1987 | O'Neill | 123/496 |
| 4,788,960 | 12/1988 | Oshizawa | 123/357 |
| 5,056,488 | 10/1991 | Eckert | 123/496 |
| 5,094,216 | 3/1992 | Miyaki | 123/496 |
| 5,115,783 | 5/1992 | Nakamura | 123/496 |
| 5,271,366 | 12/1993 | Shimada | 123/496 |
| 5,345,916 | 9/1994 | Amanio | 123/496 |

*Primary Examiner*—Carl S. Miller
*Attorney, Agent, or Firm*—Kenyon & Kenyon

[57] ABSTRACT

A system is provided for controlling a fuel-metering device, for a diesel engine. First means generate a first signal for triggering a first actuating means (115) for establishing the start of pump delivery and the end of delivery. Second means generate a second signal for triggering a second actuating means (125) for establishing the delivery rate. In this case, a signal characterizing the start of pump delivery is taken into consideration by the second means.

4 Claims, 4 Drawing Sheets

SYSTEM FOR CONTROLLING A FUEL-METERING DEVICE

This is a continuation of application Ser. No. 08/302,677, filed as PCT/DE93/01121, Nov. 25, 1993, now abandoned.

BACKGROUND OF THE INVENTION

The present invention relates to a system for controlling a fuel-metering device, in particular for a diesel engine.

A system for controlling a fuel-metering device is disclosed by SAE paper 850542. This paper describes a controlling system for a fuel pump, by means of which, via a power output stage, an electronic control unit controls an electromagnetically operated valve assigned to the fuel pump. This control unit determines the desired instants for the start of pump delivery and the end of pump delivery of the fuel metering in dependence upon the operating state of the internal combustion engine. On the basis of these desired instants, the control unit calculates the trigger instants for the power output stage, so as to allow the electromagnetic valve to assume a position which will enable the fuel pump to deliver fuel or which will end the pump delivery.

This type of system merely allows the start of pump delivery and the delivery capacity to be adjusted. It does not allow the delivery rate to be independently adjusted. Adjusting the start of pump delivery automatically results in the delivery rate being adjusted, that is unless the camshaft shape only permits a constant delivery rate. Such a device does not allow a constant delivery rate, given different starts of pump delivery; nor does it allow any desired delivery rate to be adjusted independently of the start of pump delivery, given any desired camshaft shape. The delivery rate is usually described as the injected fuel quantity per unit of time, or rather the injected fuel quantity per degree of camshaft angle.

German Published Patent Application 35 40 313 discloses a device in which the start of pump delivery is adjustable by means of a cam disk. The end of delivery and, thus, the fuel quantity to be metered in is set by means of a solenoid valve. This device does not allow the delivery rate and the start of pump delivery to be adjusted independently of one another.

An object of the present invention is to enable the delivery rate and the start of pump delivery to be precisely adjusted independently of one another in a system for controlling a fuel-metering device.

SUMMARY OF THE INVENTION

A system according to the present invention enables the start of pump delivery and the delivery rate to be adjusted very precisely, completely independently of one another.

DRAWINGS

The invention will be clarified in the following on the basis of the specific embodiments depicted in the drawings. The Figures show:

Figure 4:
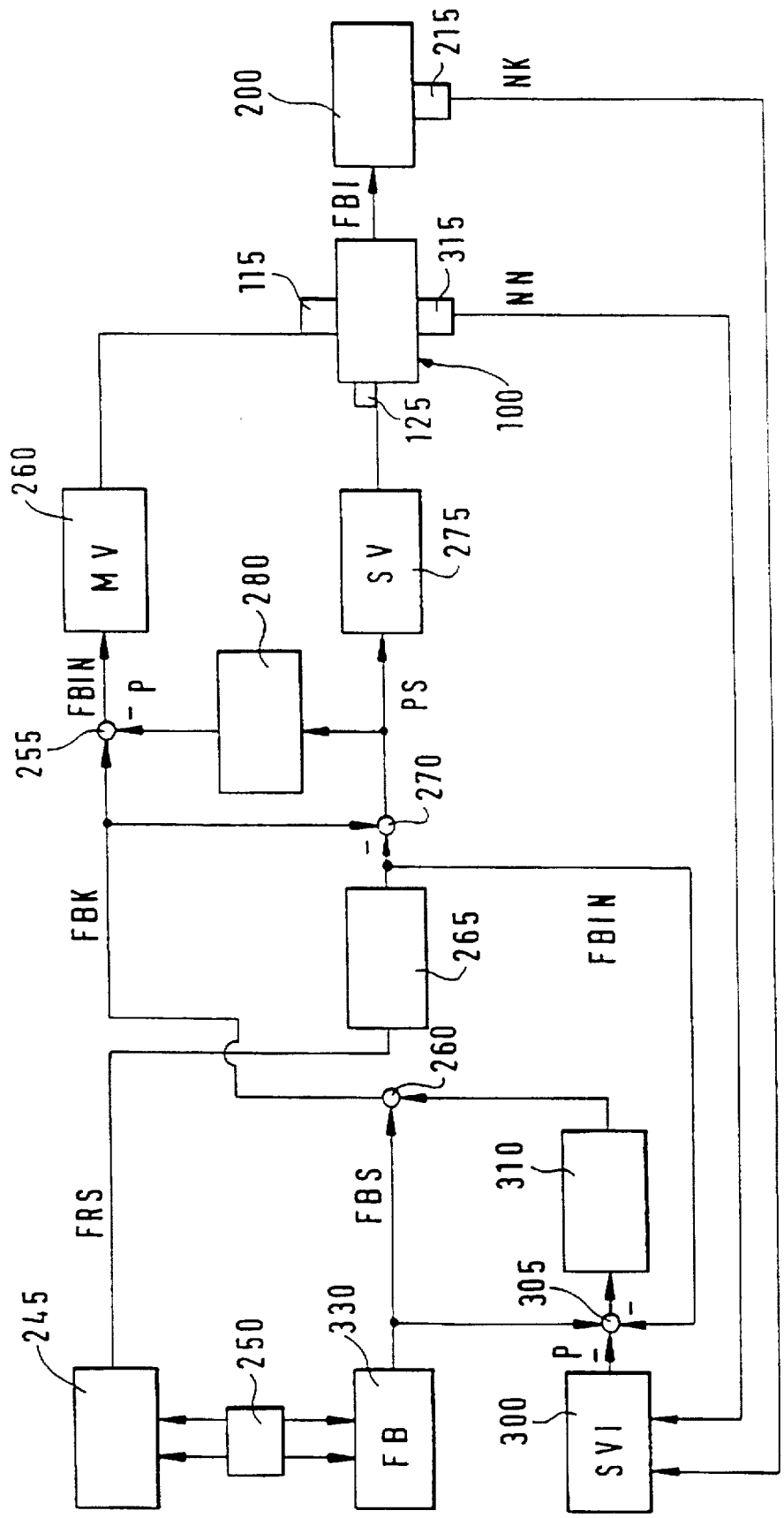
Figure 5:
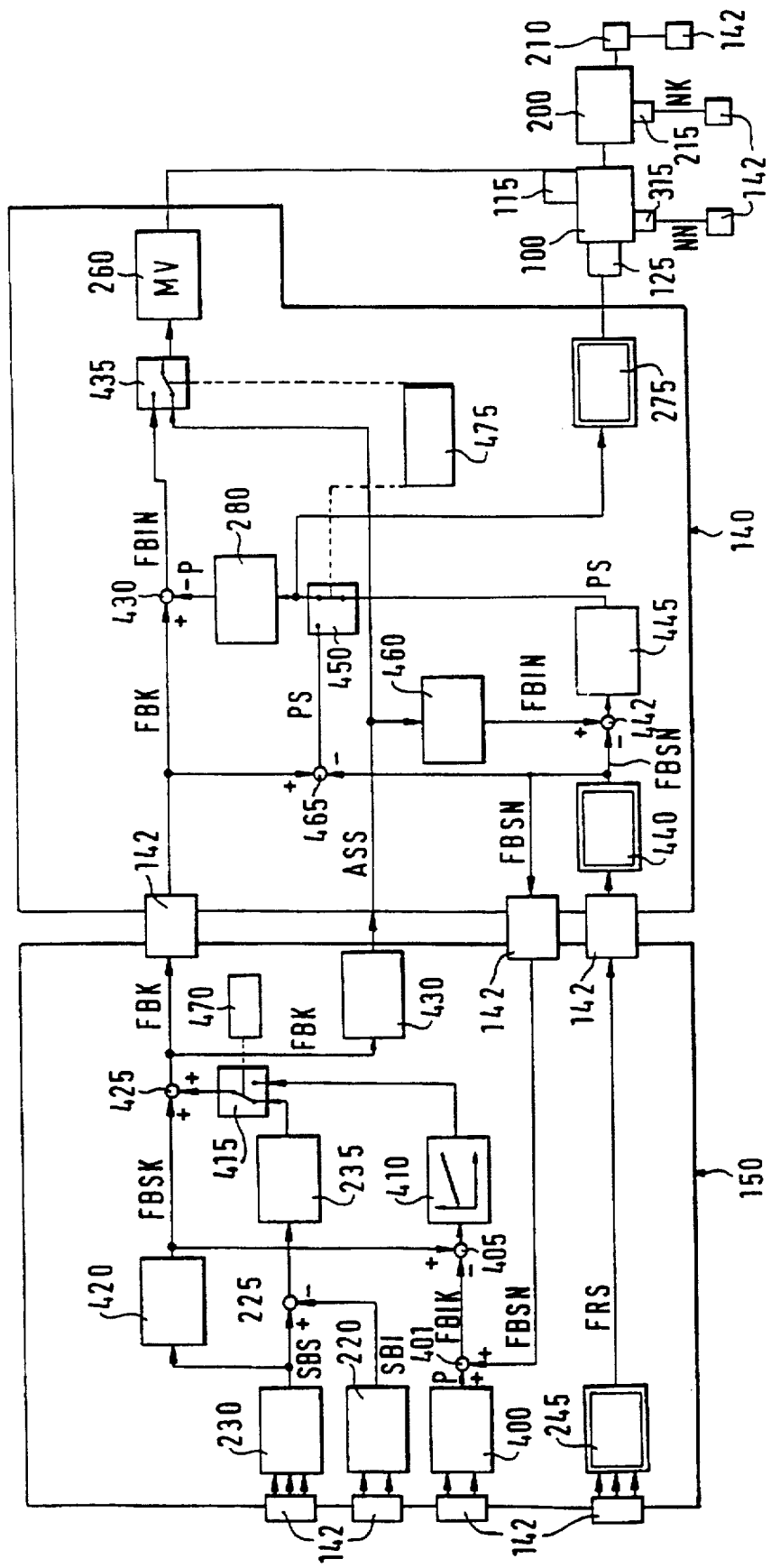

FIG. 4 a block diagram of the device according to the present invention including a start-of-pump-delivery control;

FIG. 5 is a block diagram of the device according to the invention in connection with a BUS.

DETAILED DESCRIPTION OF THE INVENTION

Figure 1:
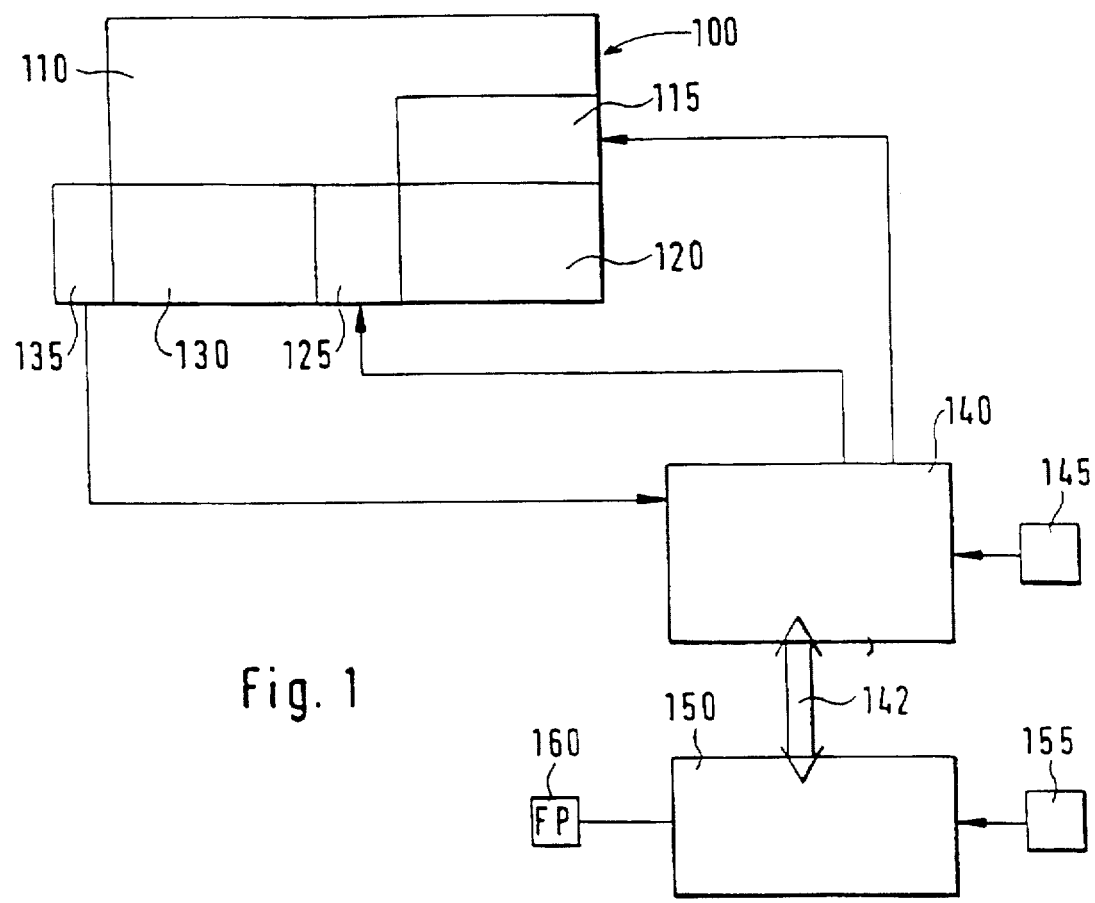
FIG. 1 is a schematic representation of the device according to the present invention.

FIG. 1 shows a fuel-metering device according to the present invention. The fuel pump 100 consists of various components. In one low-pressure part 110, the fuel is under relatively low pressure, which is maintained by a fuel-supply pump (not shown). The fuel arrives via a solenoid valve 115 in a high-pressure part 120. The high-pressure part is driven via a delivery-rate actuator 125 by a drive 130. In the high-pressure part 120, the fuel is compressed to the pressure required for injection. The rotational frequency of the drive 130 is detected by a sensor 135. This rotational frequency essentially corresponds to the camshaft speed. In place of this sensor, it is also possible to mount a speed sensor on the camshaft or on the crankshaft.

The output signal from the speed sensor 135 is coupled to a pump-control unit 140. The pump-control unit 140 sends trigger signals to the solenoid valve 115 as well as to the delivery-rate actuator 125.

In accordance with an embodiment of the present invention, the pump-control unit 140 is comprised of two separately arranged components. The actual pump-control unit 140 is then connected via appropriate connecting means 142 to a valve-timing unit 150, as well as to the various sensors and possibly to other control units. BUS systems are preferably used as connecting means 142.

The valve-timing system processes the engine-specific parameters and supplies the appropriate signals via the connecting means 142 to the pump-control 140. The valve-timing unit 150 sends appropriate signals via the connecting means 142 to the pump-control unit 140. Thus, for example, the angular position of the camshaft and/or of the crankshaft, at which the fuel delivery is supposed to begin, is transmitted as a digital quantity. Other, preferably digital signals indicate the desired delivery capacity, as well as the desired delivery rate. The pump control unit 140 converts these preferably digital signals into corresponding trigger signals, to be received by the solenoid valve 115 and the delivery-rate actuator 125.

Sensors 145, which are connected to the pump-control unit 140, detect pump-specific data, such as the position of the drive shaft 130. By means of the sensors 155, the engine-specific data, as well as other operating parameters, such as temperature and pressure values, are detected and supplied to the valve-timing unit 150, and are processed by this unit. An accelerator-pedal position sensor 160 supplies a signal to the valve timing unit 150, which indicates the driver's wish.

The mechanical components of the fuel pump 110 essentially correspond to the components of the fuel pump described in FIG. 1 of the German Published Patent Application 35 40 313.

However, the method of operation of this device, in conjunction with the pump-control unit 140 according to the present invention, is different. By triggering the solenoid valve 115, in the case of the device according to the present invention, both the start of pump delivery as well as the end of delivery are fixed. The solenoid valve 115 can also be described as a first control means for fixing the start of pump delivery and the end of delivery. The delivery-rate actuator 125, which is used in prior art system to adjust the start of pump delivery, is merely employed here to adjust the delivery rate. The delivery-rate actuator 125 is also described as a second control means.

The structure and the method of operation of the control unit will be described in the following on the basis of specific embodiments according to FIGS. 2 through 5.

Figure 2:
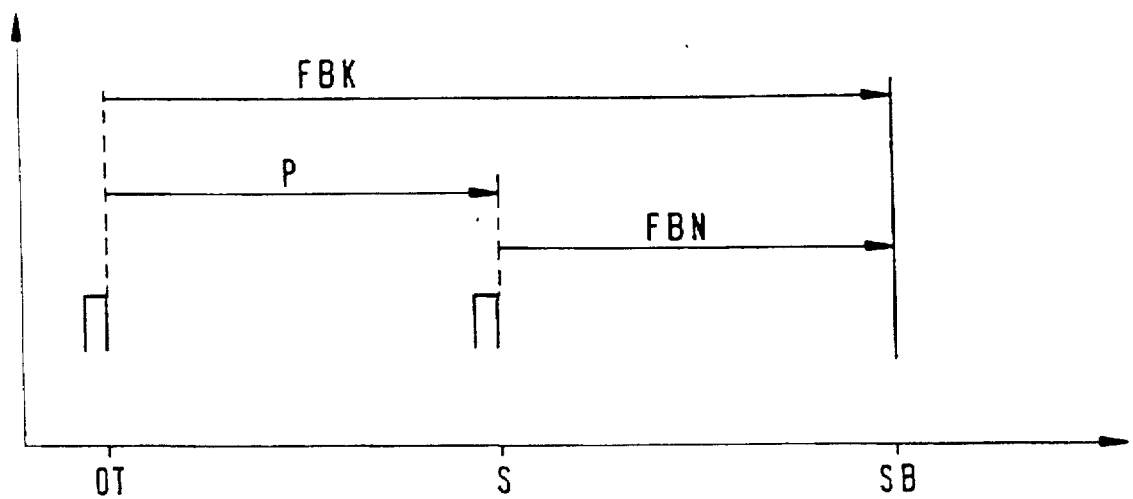
FIG. 2 shows the interrelationship of various signals.

In FIG. 2, various occurring signals are plotted over the angle. OT denotes a signal characterizing the top dead center of the crankshaft; S denotes a synchronization pulse on the drive shaft of the pump; and SB the point of injection. On the basis of the top dead center OT, the start of injection is specified by means of the signal FBK as an angular size. This signal FBK indicates the angular distance between the top dead center and the start of injection SB. In the following, FBSK denotes the setpoint value of this signal, and FBIK the actual value.

On the basis of the synchronization pulse S, the beginning of injection is specified as an angular size by means of the signal FBN. This signal FBN indicates the angular distance between the synchronization pulse S and the beginning of injection SB. The setpoint value of this signal is denoted in the following by FBSN, and the actual value by FBIN.

The phase shift between the signal FBK and FBN is denoted by P. This quantity P indicates by how many degrees the delivery-rate actuator 125 is adjusted.

If the beginning of injection is specified, starting from the top dead center, by means of the signal FBK, as an angular size, which is related to the crankshaft, then an adjustment of the delivery-rate actuator has no effect on the beginning of injection. However, if the beginning of injection is specified, starting from the synchronization pulse S, by means of the signal FBN, as an angular size that is related to the drive shaft, then in the case that the delivery rate actuator is 125 adjusted, the resultant phase shaft must be considered in the determination of the start of injection.

Figure 3:
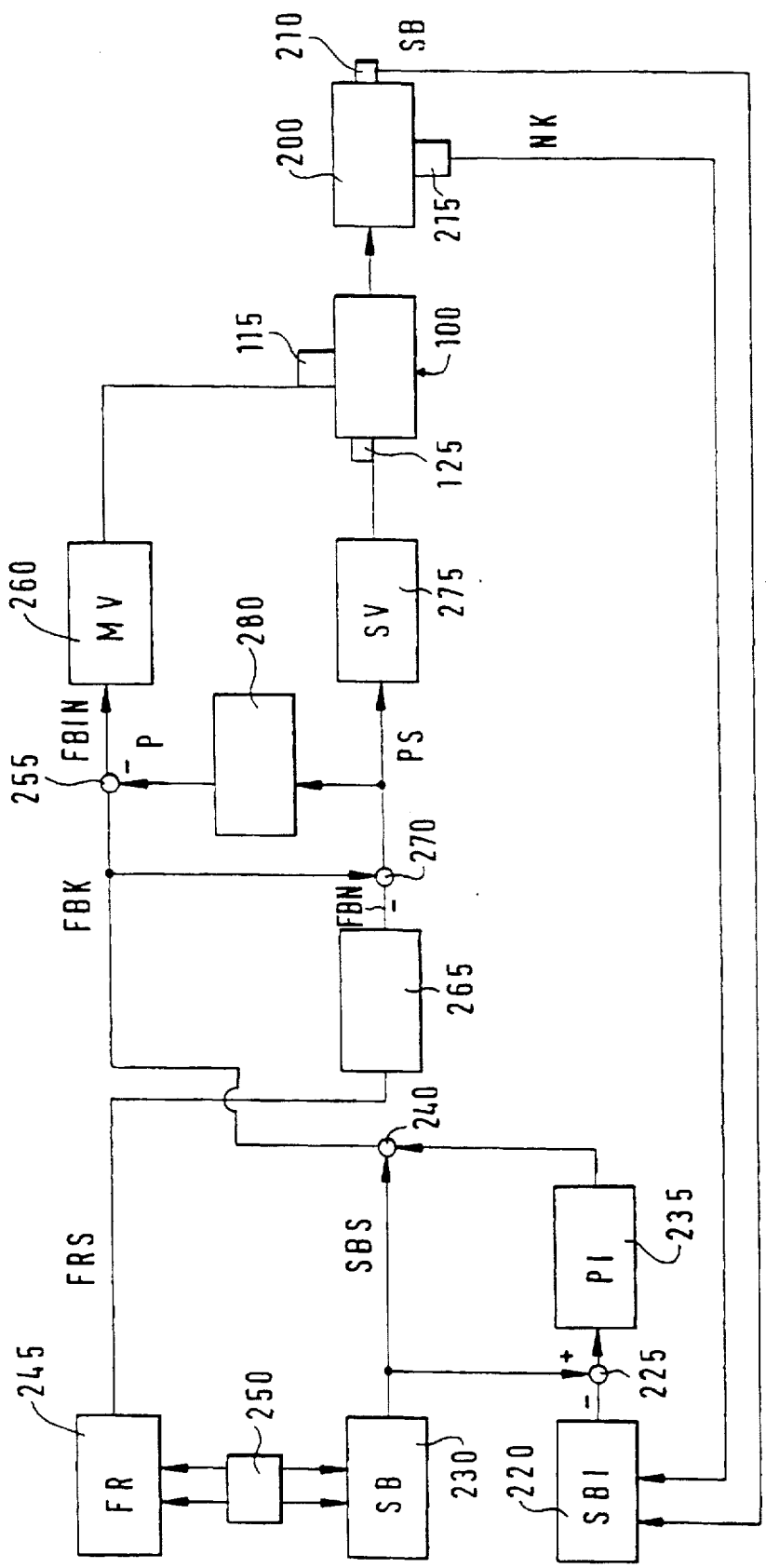
FIG. 3 is a block diagram of the device according to the present invention including a start-of-injection control.

FIG. 3 illustrates a control unit implementing closed-loop control of the start of injection.

A specific quantity of fuel is metered by the fuel pump 100 into an internal combustion engine 200. The precise start of injection SB is detected by a sensor 210. For this purpose, so-called needle-motion sensors are preferably used, which detect the motion of the needle of the injection valve. In addition, a sensor 215, which determines the speed NK and/or the position of the crankshaft, is mounted on the internal combustion engine 200. These two signals are fed to a device 220, which calculates a signal SBI indicating the actual start of injection. This signal SBI arrives with a negative operational sign via a summing point 225 at a loop controller 235. This controller preferably exhibits a PI control response. The output signal from the start-of-injection characteristics map 230 is applied to the second input of the summing point 225. In this start-of-injection characteristics map 230, the setpoint value SBS for the start of injection is stored in dependence upon the output signal from various sensors 250. This signal indicates the angular position of the crankshaft, at which the beginning of injection is supposed to take place, to achieve optimum operating characteristics.

The output signal from the controller 235 is combined in the node 240 with the setpoint value SBS. As a result, a pilot control is achieved. The node 240 is connected via the summing point 255 to the solenoid-valve drive circuit 260. The solenoid-valve drive circuit 260 then applies a signal to the solenoid valve 115, which signal opens or closes the solenoid valve, given the optimal angular position of the camshaft.

In addition, a delivery-rate characteristics map 245 is provided, which specifies a setpoint value FRS for the delivery rate. In the calculation 265 of start of pump delivery, this signal is converted into a start of delivery signal FBN. The output signal FBN from the calculation 265 of start of pump delivery arrives via a summing point 270 at a drive circuit 275 for the delivery-rate actuator, which triggers the delivery-rate actuator 125. A signal PS, which represents a setpoint value for the phase shift between the drive shaft and the crank shaft, is applied to the output of the summing point 270. This signal PS indicates the amount the delivery rate actuator 125 is to be rotated.

Furthermore, the output signal FBK from the node 240 is supplied to the summing point 270. The output signal from the summing point 270 is supplied, in turn, via a delivery-rate actuator model 280 to the summing point 255. The functioning of the device is now as follows:

The delivery rate FRS is stored in the delivery-rate characteristics map 245 in dependence upon various operating parameters. On the basis of this setpoint value for the delivery rate FRS, the calculation 265 for the start of pump delivery calculates the required start of pump delivery FBN in relation to the camshaft to adjust the delivery rate. As shown in FIG. 2, the setpoint value required for the phase shift PS is obtained by subtracting FBK and FBN in the summing point 270. This setpoint value for the phase shift PS is synonymous with the setpoint value for the adjustment angle PS of the delivery-rate actuator 125.

Now, on the basis of this signal, the delivery-rate-actuator drive circuit 275 calculates a trigger signal to be applied to the delivery-rate actuator 125 and triggers this actuator accordingly.

In the start-of-injection characteristics map 230, the desired start of injection SBS is stored in dependence upon various operating parameters. This signal indicates the angular position of the crankshaft, at which the injection is supposed to begin.

On the basis of signal NK from sensor 215 and sensor 210, block 220 calculates an angular signal SBI, which indicates at which angular position of the crankshaft the injection actually begins.

In dependence upon the comparison between the setpoint signal SBS and the actual beginning of injection SBI, the controller 235 determines a quantity to correct the setpoint value stored in the beginning-of-pump-delivery characteristics map 230. The setpoint signal SBS is corrected in node 240 by means of the output signal from the controller 235.

The solenoid-valve drive circuit 260 receives the output signal, which has been corrected by the controller 235, from the start-of-injection characteristics map 230. Since the solenoid-valve drive circuit 260 specifies the trigger signals on the basis of the angular position of the drive shaft, the signal FBK must be converted to a signal FBIN specific to the drive shaft by means of the phase shift P. To this end, the phase shift P between the crankshaft and the drive shaft must be subtracted in the summing point 255 from the signal FBK that is specific to the crankshaft.

On the basis of this signal FBIN, the solenoid-valve drive circuit 260 subsequently calculates the trigger signal to trigger the solenoid valve 115 at the correct instant so as to ensure that the fuel metering begins at the correct moment.

When the delivery-rate actuator 125 is adjusted, the phase shaft P between the crankshaft and the drive shaft changes. As a result, the start of injection also changes when it is preselected in relation to the drive shaft. This shift in the start of injection on the basis of the adjustment to the delivery-rate actuator must be considered when the solenoid valve 115 is triggered. To render this possible, the delivery-rate-actuator model 280 calculates the corresponding actual position of the deliver-rate actuator and, thus, the phase shift P on the basis of the setpoint value for the adjustment angle PS. This delivery-rate-actuator model 280 is preferably a time-delay element, which takes into consideration the delay between the triggering of and reaction by the delivery-rate actuator 125. This signal then considers the solenoid-valve drive circuit 260 in the calculation of the signal to be applied to the solenoid valve 115.

Since a different delivery rate results depending upon the start of injection, the signal FBK must likewise be considered when the adjustment is made to the delivery-rate actuator. For this purpose, the output signal from the start-of-pump-delivery calculation 265 and the output signal FBK from the summing point 240 are combined. This signal then arrives at the trigger circuit 275 for the delivery-rate actuator 125. While allowing for the start of injection, this adjustment angle indicates the angle by which the delivery-rate actuator 125 is to be adjusted in order to attain the desired delivery rate.

The start of injection is adjusted through the turn-on time of the solenoid valve, and the delivery rate through the adjustment to the delivery-rate actuator. The start of injection can be adjusted independently of the dynamic response of the delivery-rate actuator, and it can be varied from injection to injection, even at high speeds. This is achieved in that the start of injection acts dynamically and directly on the triggering of the solenoid valve, and the delivery rate on the delivery-rate-actuator drive circuit. The actual adjustment angle of the delivery-rate actuator can be simulated with the appropriate model 280 and allows the delivery-rate actuator to be considered accordingly when the trigger signal is generated for the solenoid valve.

FIG. 4 depicts a specific embodiment without a needle-motion sensor 210. Elements corresponding to those in FIG. 3 are denoted by corresponding reference numerals. In contrast to FIG. 3, a sensor 315, which detects the position of the camshaft, is provided in place of the start-of-injection sensor 210. The output signal from this sensor 315 is a coupled to a device 300. This device is connected, furthermore, to the sensor 215 and the summing point 305, which corresponds to the summing point 225 of FIG. 3. Furthermore, the output signal FBIN from the start-of-pump-delivery calculation is fed back to the summing point 305. Furthermore, the start-of-injection controller 235 is replaced by a start-of-pump-delivery controller 310.

On the basis of the synchronization pulse S and the signal OT, which indicates the top dead center, the device 300 determines the phase shift P and, thus, the degree of adjustment of the delivery-rate actuator. The sum of the phase shift P and of the output signal FBIN from the start-of-pump-delivery calculation corresponds to the actual value FBIK of the start of pump delivery. This actual value is compared in the summing point 305 to the setpoint value FBS from the start-of-pump-delivery characteristics map 330. On the basis of this comparative result, the start-of-pump-delivery controller 310 specifies a trigger signal FBK to be applied to the solenoid-valve drive circuit 260.

Another embodiment of the device according to the invention is shown in FIG. 5. Elements corresponding to those already described with respect to FIGS. 1 through 4 are denoted by the same reference numerals and will not be clarified in any further detail.

In FIG. 5, the structure of the valve-timing unit 150 and of the pump-control unit 140 are described in greater detail. The valve-timing unit 150 comprises the device 220, the start-of-injection characteristics map 230, the delivery-rate characteristics map 245, as well as the start-of-injection controller 235.

The delivery-rate characteristics map 245 is connected via the connecting means 142 to the pump-control unit. An actual-value determination element 400 is connected via a summing point 401 and a summing point 405 to a start-of-pump-delivery controller 410. The start-of-pump-delivery controller 410 is connected to the switching contact normally closed contact of a first switch 415. The output signal from the start-of-injection controller 235 is applied to the break contact of the first switch 415. The output signal from the summing point 225 is applied to its the start-of-injection controller's 235 input. The summing point 225 combines the output signals from the start-of-injection characteristics map 230 and the actual-value determination 220.

The output signal SBS from the start-of-injection characteristics map arrives furthermore at a propagation-delay determination element 420. The output signal FBSK from the propagation-delay determination element 420 arrives at the summing point 405. The output signal FBSK from the propagation-delay determination element 420 is combined, in addition, in the summing point 425 with the output signal from the first switch 415. This signal FBK arrives, on the one hand, via the connecting means 142 at the pump-control unit 140 and, on the other hand, at an ASS generation 430. The output signal ASS from the ASS generation 430 preferably arrives via a signal line at the pump-control unit 140.

A signal FBSN from the pump-control unit arrives via the connecting means 142 at the summing point 401.

The design of the pump-control unit 140 is as follows. The signal FBK arrives via the summing point 430 at a second switch 435. Furthermore, the signal ASS arrives at the second switch 435. Depending on the position of the second switch 435, one of these two signals arrives at the solenoid-valve drive circuit 260.

The setpoint value for the delivery rate FRS arrives at the characteristics map 440. The output signal FBSN from the characteristics map 440 arrives at the summing point 442 as well as at the summing point 465, in each case with a negative operational sign. The summing point 442 is connected to the input of a delivery-rate controller 445. This controller, in turn, applies a signal to a third switch 450.

The summing point 465 combines the signals FBSN and FBK. The result of this operation arrives at the third switch 450. The switch 450 selects one of the two signals and applies a signal to the drive circuit 275 for the delivery-rate actuator 125 and the delivery-rate actuator model 280. The delivery-rate actuator model 280, in turn, applies a signal to the summing point 430.

The signal ASS arrives furthermore via the ASS detection element 460 at the summing point 442.

The first switch 415 is switched by a first change-over device 470. The second and the third switch are switched by a second change-over device 475. The change-over devices can be integrated both in the control units 150 and 140 or be arranged separately from them. In the latter case, only one change-over device is needed.

The change-over devices detect unacceptable operating conditions. Such unacceptable operating conditions occur when one of the two control units 150 or 140 no longer works correctly, when the needle-motion sensor 210 fails, or when there is no longer a reliable ASS signal at hand.

The pump-control unit and the valve-timing unit function in the manner described in the following.

In the normal operating state, the switches are in the positions as drawn in. In this case, the valve-timing system 150 transmits a signal ASS to the solenoid-valve drive circuit 260, which releases the start of injection in relation to the crankshaft. For this purpose, in the manner described for FIG. 3, the start-of-injection controller specifies a signal FBK, which indicates the crankshaft angle, at which the start of injection is released. This angular signal is converted in the ASS generation element 430 by means of an angle-time conversion (for example: a crankshaft IWZ sacheal value number). This pulse signal is transferred by the valve-timing unit 150 via a separate line to the pump-control unit 140 and releases the trigger pulse for the start of injection in the solenoid-valve drive circuit 260.

The setpoint value stored in the delivery rate characteristics map 245 for the delivery rate is transmitted as a digital signal via the connecting means 142 from the valve-timing unit to the pump-control unit. In the pump-control unit 140, this signal is converted in the characteristics map 440 into an angular size FBSN. The shape of the camshaft that drives the high-pressure part 120 is simulated in this characteristics map 440.

The angular size FBSN specifies the setpoint value for the start of delivery in relation to the drive shaft. On the basis of the pulse signal ASS, the ASS detection element 460 determines an angular size FBIN, which indicates the actual value of the start of pump delivery in relation to the drive shaft. Based on the comparison between these two signals, the delivery-rate controller 445 produces a signal PS to be applied to the drive circuit 275 for the delivery-rate actuator. This signal indicates the desired phase shift PS between the crankshaft and the drive shaft.

If one of the change-over devices 470 or 475 recognizes that an unacceptable operating state is at hand, then the change-over devices 470 and 475 trigger the switches 415, 435 and 450 to go over to their second position. If the system is always supposed to function without an ASS signal, then the switches 435 and 450, as well as the change-over device 475, can be eliminated.

When the switch 415 is actuated, the transition is made from a start-of-injection control to a start-of-pump-delivery control. This takes place preferably when the functioning of the sensor 210 is faulty, or rather when no such sensor is provided. The phase shift P is determined in the actual-value determination 400. For this purpose, the signals from the sensors 315 and 215 are evaluated. The phase shift P results directly from the distance between the signal OT, which indicates the top dead center, and the synchronization pulse S.

In conjunction with the setpoint value FBSN, which is made available by the pump-control unit 140 by way of the connecting means 142, the actual value FBIK for the start of pump delivery in relation to the crankshaft is available at the summing point 401. This actual value is compared in the summing point 405 to the setpoint value FBSK for the start of pump delivery. On the basis of this comparison, the start-of-pump-delivery controller 410 determines a signal FBK, which indicates the start of pump delivery in relation to the crankshaft. This signal FBK is then transmitted via the connecting means 142 to the pump-control unit 140.

Since the solenoid valve drive circuit 260 produces the trigger signals in relation to the drive shaft, the signal FBIK made available by the valve-timing system must be converted for the start of pump delivery into a signal FBIN that relates to the drive shaft. For this purpose, the phase shift P is subtracted from the signal FBIK in the summing point 430. The phase shift is made available by the delivery-rate actuator model 280. In accordance with one model, this delivery-rate actuator model simulates the actual phase shift on the basis of the setpoint value PS for the phase shift. In a first approximation, this model is a time-delay element, which simulates the performance characteristics of the delivery-rate actuator. The setpoint value PS for the phase shift results from the difference between the output signal from the characteristics map 440 and from the signal FBK, which is made ready by the valve-timing system. This difference is made ready at the output of the summing point 465.

The delivery-rate drive circuit 175 also receives this setpoint value PS for the phase shift. Furthermore, the output signal FBSN is made ready as a setpoint value for the start of pump delivery, specific to the drive shaft, via the connecting means 142 to the valve-timing unit.

Distributing the individual functions to the two control units, as described here, is advantageous. However, this can be modified as needed; thus individual functions can also be transferred to another control unit. It is also conceivable for the two control units to be integrated in one unit. In this case, the method of functioning of the embodiment of FIG. 5 corresponds in emergency driving operation to the method of functioning of the embodiment of FIG. 4.

What is claimed is:

1. A system for controlling a fuel metering device, comprising:

a first signal generator for generating a first signal;

a first actuator, coupled to the first signal generator, the first actuator being triggered by the first signal to establish a start of pump delivery and an end of pump delivery for the fuel metering device;

a second signal generator for generating a second signal;

a second actuator, coupled to the second signal generator, the second actuator establishing a delivery rate of the fuel metering device based upon the second signal;

a third signal generator for generating a third signal indicative of the start of pump delivery;

wherein the second signal generator adjusts the second signal as a function of the third signal; and a fourth signal generator for generating a fourth signal indicative of the delivery rate of the fuel metering device;

wherein the first signal generator adjusts the first signal as a function of the fourth signal.

2. The system according to claim 1, wherein the first actuator is a solenoid valve.

3. The system according to claim 1, wherein the first signal generator includes:

one of an automatic control of a start of injection and an automatic control of the start of pump delivery, which generates the first signal based upon a comparison of a setpoint value and an actual value.

4. The system according to claim 1, wherein the second signal generator includes:

an automatic control of the delivery rate of the fuel metering device, which generates the second signal based upon a comparison of a setpoint value and an actual value.

* * * * *